(12) United States Patent
Nishio

(10) Patent No.: US 6,474,429 B1
(45) Date of Patent: Nov. 5, 2002

(54) FRAME STRUCTURE OF BATTERY POWERED INDUSTRIAL VEHICLE

(75) Inventor: Jun Nishio, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/500,279

(22) Filed: Feb. 8, 2000

(30) Foreign Application Priority Data

Feb. 8, 1999 (JP) .......................................... 11-030082

(51) Int. Cl.[7] .............................................. B60R 16/04
(52) U.S. Cl. ....................... 180/68.5; 180/311; 280/783
(58) Field of Search ............................... 180/68.5, 89.1, 180/65.1, 311, 313; 280/783, 785; 296/203.03, 29

(56) References Cited

U.S. PATENT DOCUMENTS

| | | | | |
|---|---|---|---|---|
| 1,079,709 A | * | 11/1913 | Lloyd | 180/68.5 |
| 1,411,875 A | * | 4/1922 | Schroeder | 280/783 |
| 3,463,542 A | * | 8/1969 | Daniels | 296/65.05 |
| 3,497,090 A | * | 2/1970 | Daniels | 414/347 |
| 4,317,497 A | * | 3/1982 | Alt et al. | 180/68.5 |
| 4,362,220 A | * | 12/1982 | Baston | 180/68.5 |
| 4,991,674 A | * | 2/1991 | Fullenkamp | 180/68.5 |
| 5,114,207 A | * | 5/1992 | Nakajima et al. | 296/204 |
| 5,806,948 A | * | 9/1998 | Rowan, Sr. et al. | 312/293.3 |
| 6,189,636 B1 | * | 2/2001 | Kikukawa | 180/68.5 |

FOREIGN PATENT DOCUMENTS

JP  5-254460  5/1993

* cited by examiner

Primary Examiner—Robert P. Olszewski
Assistant Examiner—James S. McClellan
(74) Attorney, Agent, or Firm—Morgan & Finnegan, LLP

(57) ABSTRACT

A frame structure for an industrial vehicle includes a lower plate, a front frame portion, a rear frame portion and a battery chamber. The front frame portion is spaced from the rear frame portion. The battery chamber is located between the front frame portion and the rear frame portion. The battery chamber has an opening at a side of the frame structure for receiving a battery. The frame structure further includes a side bar for coupling the front frame portion with the rear frame portion. The side bar extends along the periphery of the opening.

18 Claims, 3 Drawing Sheets

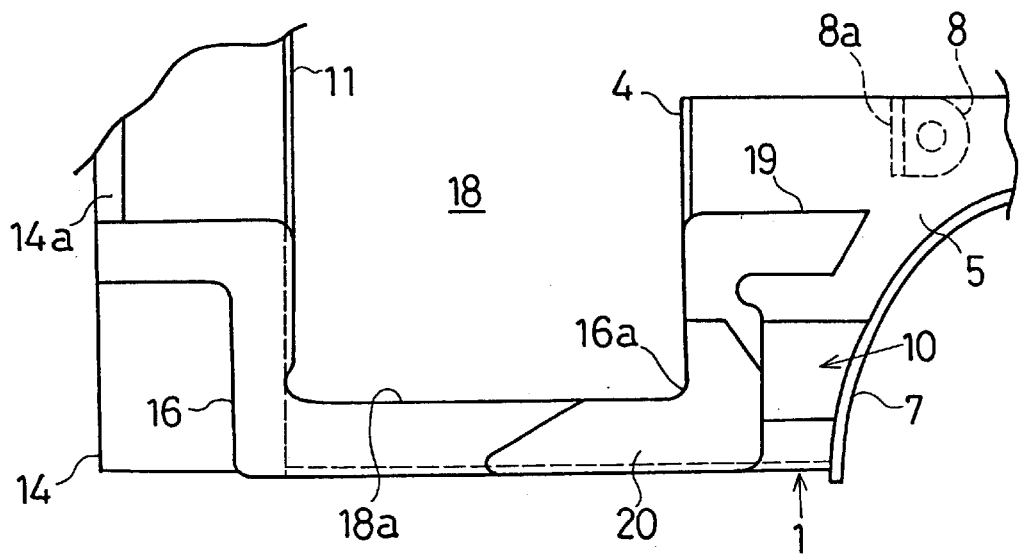
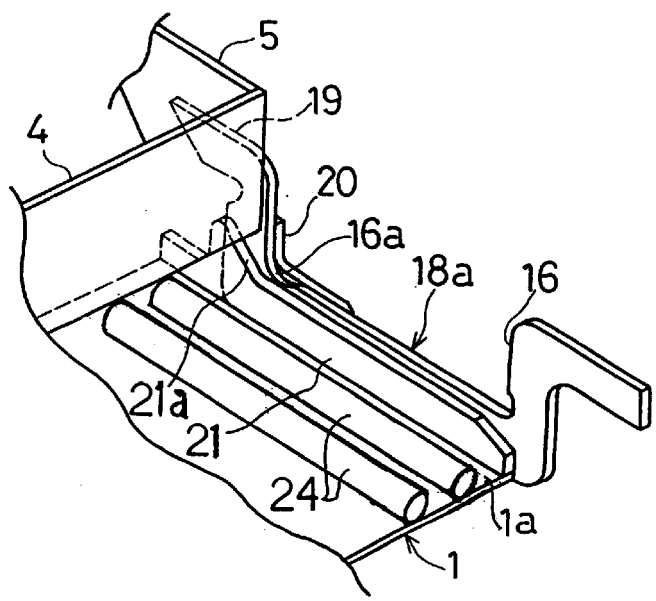

FRAME STRUCTURE OF BATTERY POWERED INDUSTRIAL VEHICLE

BACKGROUND OF THE INVENTION

The present invention relates to a frame structure for battery powered industrial vehicles.

FIG. 6 illustrates a reinforced frame structure for a battery-powered forklift, which is disclosed in Japanese Unexamined Patent Publication No. 5-254460. A front cross plate 52 and a rear cross plate 53 are coupled to the front and rear ends of a lower frame 51, respectively. The front cross plate 52 and the rear cross plate 53 are coupled to each other by upper side bars 54 and a lower side bars 55. Each lower side bar 55 has an L-shaped cross section.

The upper side bars 54 are welded to the plates 52, 53. The lower side bars 55 are fixed to the plates 52, 53 by T-shaped joiners or by flange joiners (not shown). A battery chamber 56 is defined by the upper side bars 54, the lower side bars 55, the front cross plate 52 and the rear cross plate 53. A battery (not shown) is accommodated in the battery chamber 56.

The frame structure of FIG. 6 may be used in a forklift. When such a forklift carries an object, great stress is applied to the welded points of the frame structure. The upper side bars 54 reinforce the frame structure to resist the stress.

When changing the battery, the battery is lifted from the battery chamber 56. However, since the battery may be very heavy, lifting the battery is troublesome. Alternatively, the battery may be removed horizontally from the battery chamber 56. However, in this case, one of the upper side bars 54 must be removed.

Removing one of the upper side bars 54 causes the welded points of the other side bar 54 and the welded points of the lower side bars 55 to receive greater stress. Accordingly, the life of the frame structure is shortened.

The battery may be removed horizontally over one of the upper side bars 54, which eliminates the necessity for removing the upper side bars 54. However, the battery must be located at a relatively high position, which raises the driving position of the operator. That is, the height of the driver's seat is raised accordingly. The head guard of the forklift must also be raised. A higher head guard of the forklift hinders indoor operation of the forklift.

SUMMARY OF THE INVENTION

Accordingly, it is an objective of the present invention to provide a reinforced frame structure for a battery powered industrial vehicle that permits a low position of a battery in the vehicle and allows the battery to be removed horizontally.

To achieve the foregoing and other objectives and in accordance with the purpose of the present invention, an improved frame structure for an industrial vehicle is provided. The frame structure includes a lower plate, a front frame portion, a rear frame portion and a battery chamber. The front frame portion is spaced apart from the rear frame portion and the battery chamber is located between the front frame portion and the rear frame portion. The battery chamber has an opening at a side of the frame structure for receiving a battery. The frame structure further includes a coupler for coupling the front frame portion with the rear frame portion. The coupler extends along the periphery of the opening.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiment together with the accompanying drawings in which:

FIG. 3 is a side view showing a right side bar of the frame structure of FIG. 1;

FIG. 4 is a partial perspective view showing a reinforcement of the frame structure of FIG. 1;

DETAILED DESCRIPTION OF THE PREFERRED EMBODIMENTS

One embodiment according to the present invention will now be described with reference to FIGS. 1 to 5.

Figure 1:
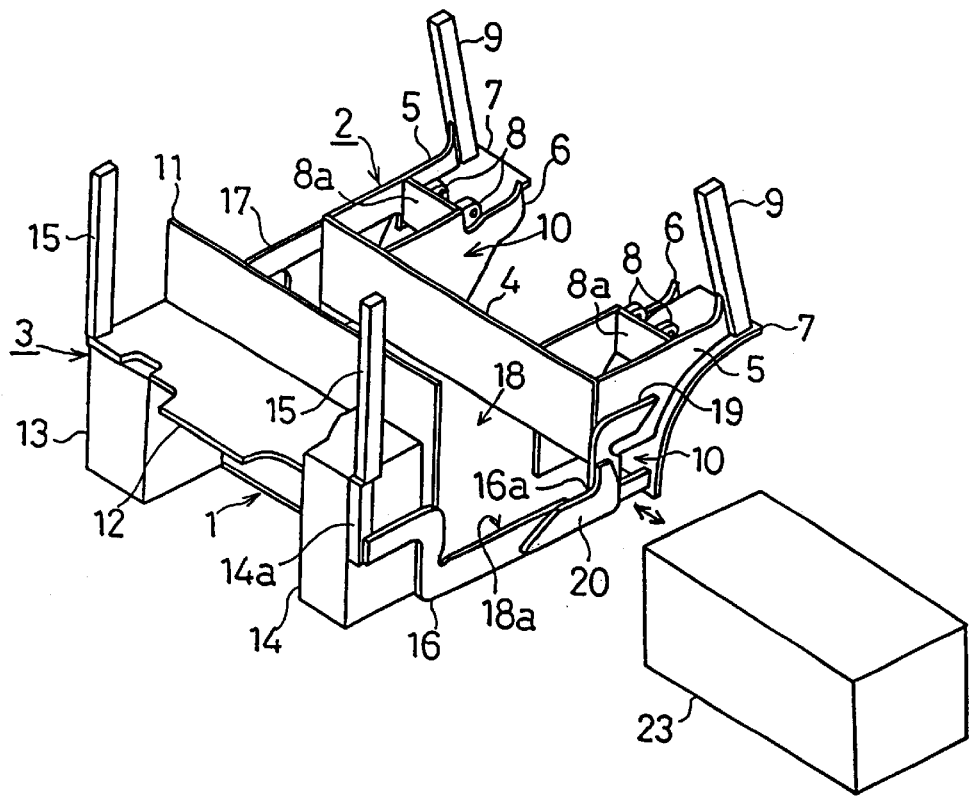
FIG. 1 is a rear right perspective view illustrating part of a frame structure according to the present invention.
Figure 2:
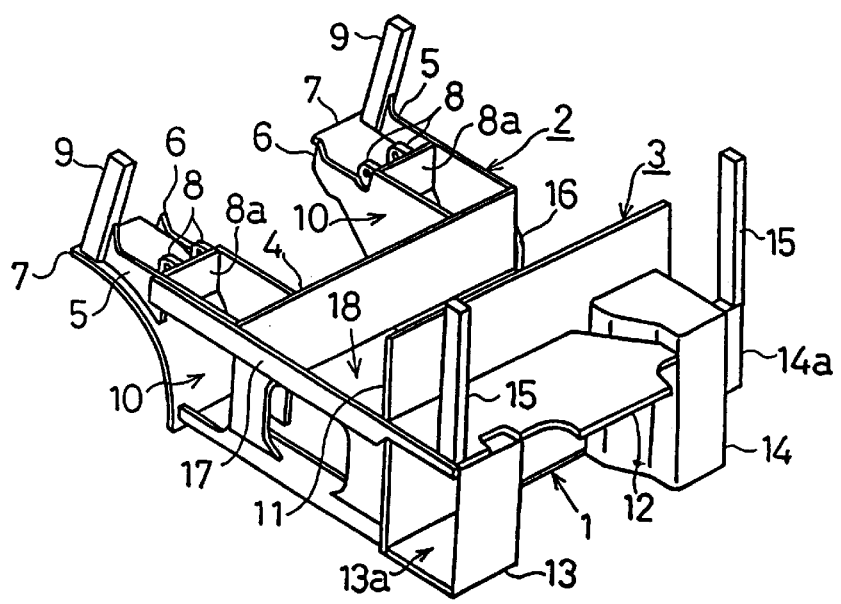
FIG. 2 is a rear left perspective view showing the frame structure of FIG. 1.

FIGS. 1 and 2 show the frame structure of a battery-powered forklift. The frame structure includes a lower plate 1. A front frame portion 2 and a rear frame portion 3 are attached to the lower plate 1. The front frame portion 2 includes a front cross plate 4, a pair of side plates 5 and a pair of front axle plates 6.

A mudguard 7 is attached to each side of the front portion of the lower plate 1, such as by welding, rivets, screws or bolts. Each front axle plate 6 is secured to the inner face of the corresponding mudguard 7. The front axle plates 6 are also welded to the upper face of the lower plate 1 and the front face of the front cross plate 4. Each side plate 5 is welded or secured to the upper face of the corresponding mudguard 7 and to the front cross plate 4. The front cross plate 4 is supported by the side plates 5 and the front axle plates 6.

A pair of tilt cylinder holders 8 are located in the front portion of the frame structure. Each holder 8 includes a support plate 8a. Each support plate 8a is welded to the corresponding side plate 5 and to the corresponding front axle plate 6. In other words, each tilt cylinder holder 8 is located between the corresponding side plate 5 and the corresponding front axle plate 6. A front post 9 is welded to each mudguard 7. The lower plate 1, the front cross plate 4, the side plates 5, the front axle plates 6 and the mudguards 7 define a pair of boxes 10. The boxes 10 are spaced apart by a predetermined distance.

The rear frame portion 3 includes a rear cross plate 11, a rear axle plate 12, a rear box plate 13 and a fluid reservoir, in this case, an oil tank 14. The rear axle plate 12 is welded to the rear face of the rear cross plate 11. The oil tank 14 is welded to the rear face of the rear cross plate 11 and to the right end of the rear axle plate 12. The rear box plate 13 is welded to the rear face of the rear cross plate 11 and to the lower face of the rear axle plate 12 to define a rear box 13a. The front boxes 10 and the rear box 13a accommodate electrical devices such as motors.

The rear frame portion 3 includes a pair of rear posts 15. One of the rear posts 15 is welded to the upper face of the rear axle plate 12. The other rear post 15 is fixed to a support 14a welded to the side of the oil tank 14. The front posts 9 and the rear posts 15 support a head guard (not shown). A front protector (not shown) is located in front of the front cross plate 4. The front posts 9 are welded to the sides of the front protector.

The front frame portion 2 and the rear frame portion 3 are coupled to each other by a right side bar 16 and a left side bar 17. The right side bar 16 is bent downward and the left side bar 17 is substantially straight. The front portion of the right side bar 16 is welded to the side of the corresponding side plate 5 and to an end of the front cross plate 4. The rear portion of the right side bar 16 is welded to the support 14a and to an end of the rear cross plate 11. As shown in FIG. 2, the front portion of the left side bar 17 is welded to the corresponding side plate 5. The rear portion of the side bar 17 is welded to the left side of the rear axle plate 12.

A battery chamber 18 is defined by the lower plate 1, the front cross plate 4, the rear cross plate 11, the right side bar 16 and the left side bar 17. The battery chamber 18 has an opening 18a, which is defined by the front cross plate 4, the rear cross plate 11 and the right side bar 16. The right side bar 16 is bent along the lower side of the opening 18a. Preferably rollers 24 (FIG. 4) are located on the upper face of the lower plate 1, which forms the bottom of the battery chamber 18. Although two rollers 24 are shown, any number of rollers may be used. Further, the rollers 24 could be ball bearings, as opposed to the elongated rollers shown.

As shown in FIGS. 1 and 3, the right side bar 16 includes a part extending horizontally along the lower side of the opening 18a and vertical parts extending along the sides of the opening 18a. The right side bar 16 also has a front end portion 19 and a rear end portion extending from the upper ends of the vertical parts. The front end portion 19 is welded to the corresponding side plate 5 and is located in the vicinity of the corresponding tilt cylinder holder 8.

An L-shaped reinforcement 20 is preferably attached to a front corner portion 16a of the side bar 16. As shown in FIG. 4, a second reinforcement 21 is attached to the inside of the right side bar 16.

The second reinforcement 21 is welded to the upper face 1a of the lower plate 1. The second reinforcement 21 extends along the lower side of the opening 18a. The thickness of the second reinforcement 21 is greater than that of the lower plate 1. The reinforcement 21 adds to the rigidity of the right side bar 16 to prevent bending. The length of the reinforcement 21 is substantially the same as that of the lower plate 1. The reinforcement 21 includes a projection 21a. The location of the projection 21a corresponds to the corner portion 16a of the right side bar 16.

Figure 5:
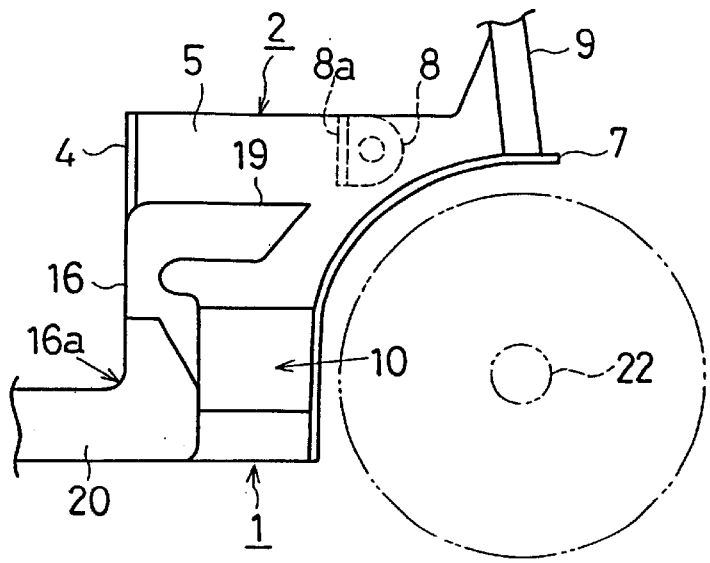
FIG. 5 is a partial side view showing the right front portion of the frame structure of FIG. 1.
Figure 6:
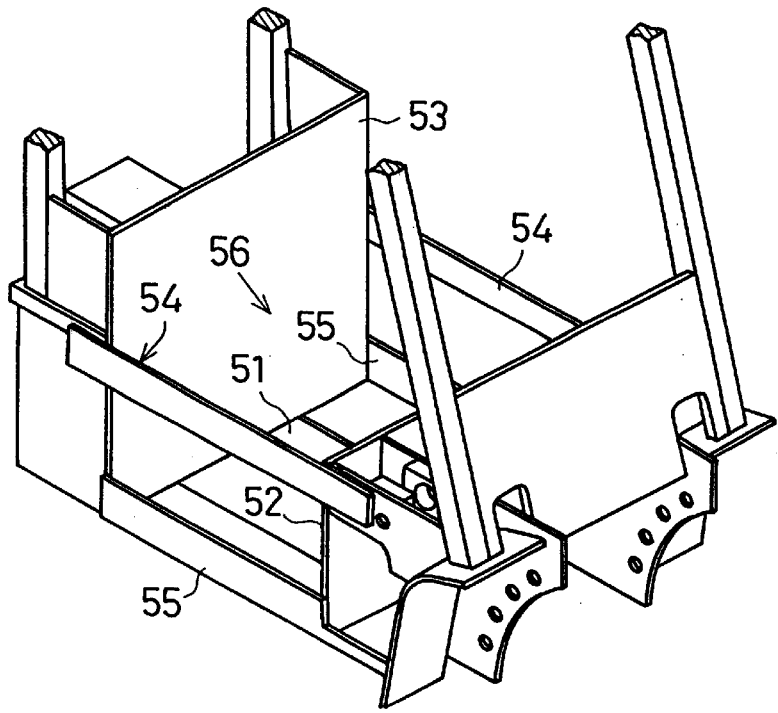
FIG. 6 is a perspective view illustrating a prior art frame structure.

As shown in FIG. 5, the front end portion 19 is located above the lower plate 1 at a position higher than the axis of a front axle 22. The front end portion 19 is also located between the front cross plate 4 and the corresponding tilt cylinder holder 8 and extends to the vicinity of the tilt cylinder holder 8. That is, the front end portion 19 is fixed to the side of the corresponding side plate 5 at a location in the vicinity of the corresponding tilt cylinder holder 8, which transmits load to the front frame portion 2.

The characteristics of the above described frame structure of a battery-powered industrial vehicle will now be described.

The right side bar 16 is bent along the opening 18a of the battery chamber 18, which allows a battery 23 to be easily installed and removed horizontally out of the battery chamber 18. Thus, the battery chamber 18 can occupy a relatively low position and the battery 23 can still be easily changed.

The battery 23 slides on the rollers (not shown) located on the surface of the lower plate 1, which facilitates changing of the battery 23. It is much easier to slide the battery 23 horizontally than to lift it vertically.

The illustrated frame structure may be used in a battery-powered forklift. In this case, relatively heavy members such as a counter weight and the battery 23 are located in the rear frame portion 3 and on the lower plate 1. When the forklift is carrying an object, the load on its mast and the forks are transmitted from the tilt cylinders to the lower plate 1 through the tilt cylinder holders 8. In this case, the lower plate 1 receives a force that brings the front frame portion 2 and the rear frame portion 3 closer to or away from each other. At this time, the lower horizontal portion of the right side bar 16 receives a bending force. However, the reinforcement 21 adds to the rigidity of the side bar 16 and permits the right side bar 16 to resist the load.

A load transmitted to the holders 8 generates a moment that moves the front frame portion 2 forward and rearward relative to the rear frame portion 3, the lower plate 1 and the front axle 22. In this case, the corner portion 16a is stressed. However, the corner portion 16a is reinforced by the reinforcements 20, 21 and the projection 21a, which add to the rigidity of the right side bar 16.

The front end portion 19 of the right side bar 16 extends to the tilt cylinder holders 8. The tilt cylinder holders 8 transmit a load to the front frame portion 2 when the forklift is lifting or lowering an object. Therefore, the side bar 16 receives the load at the front end portion 19, which is located in the vicinity of the holders 8. This reduces the load acting on the corner portion 16a of the right side bar 16. Therefore, even if the opening 18a for accessing the battery 23 is located at a relatively low position, the rigidity of the entire frame structure is maintained by the right side bar 16 and the reinforcements 20, 21.

The frame structure of the illustrated embodiment has the following advantages.

(1) The battery 23 can be horizontally removed from the opening 18a, which is located at a relatively low position of the vehicle's right side. The right side bar 16 extends along the lower side of the opening 18a of the battery chamber 18, which maintains the rigidity of the entire frame structure.

(2) The right side bar 16 is attached to the reinforcement 21 located on the lower plate 1, which reinforces the side bar 16 along the lower side of the opening 18a. The rigidity of the frame structure is thus increased.

(3) The corner portion 16a of the right side bar 16 is reinforced by the reinforcement 20 and the projection 21a of the reinforcement 21. Therefore, the front frame portion 2 is not deformed relative to the rear frame portion 3 and the lower plate 1. If stress concentrates on the corner portion 16a, the corner portion 16a is able to resist the stress.

(4) Load on the forks is transmitted to the frame structure at the cylinder holders B. The front end portion 19 of the right side bar 16 is located in the vicinity of the corresponding tilt cylinder holder 8. The right side bar 16 therefore effectively receives the load when the forklift is carrying an object.

(5) The right side bar 16 is shaped along the lower side of the opening 18a. The rigidity of the frame structure at the right side is reinforced by the curved shape of the side bar 16 and the reinforcements 20, 21. Thus, the illustrated frame structure is obtained by making only minor changes to a conventional frame structure. Specifically, the illustrated frame structure is obtained by adding the right side bar 16 to a conventional frame structure.

(6) The reinforcement 21 is attached to the right side of the lower plate 1. The reinforcement 21 is thicker than the lower plate 1 and thus effectively reinforces the right side bar 16. Compared to a case where the lower plate 1 itself is thickened, the illustrated embodiment reduces the cost.

(7) The right side bar 16, is shaped along the opening 18*a*. When the frame structure receives a load, great stress is produced only at the bent portions of the right side bar 16. Therefore, reinforcing the bent portions of the side bar 16 guarantees the strength of the entire frame structure. Since the part that needs to be reinforced is limited, the reinforcement is easy to achieve and inexpensive.

(8) The battery 23 can be moved horizontally at a relatively low position. Compared to a case where the battery needs to be lifted when changed, the illustrated embodiment facilitates the exchange of batteries. Further, the sitting position of the operator is comfortable and the head guard is not raised.

It should be apparent to those skilled in the art that the present invention may be embodied in many other specific forms without departing from the spirit or scope of the invention. Particularly, it should be understood that the invention may be embodied in the following forms.

In the illustrated embodiment, the right side bar 16 and the reinforcements 20, 21 are formed separately and assembled. However, the side bar 16 and the reinforcements 20, 21 may be integrally formed.

The shape of the right side bar 16 may be changed. The front end portion 19 or the rear end portion may be omitted. Alternatively, the angle of the corner portions of the side bar 16 and the reinforcement 20 may be other than ninety degrees. For example, the angle may be forty-five degrees or curved.

The reinforcement 20 may be attached to any part of the right side bar 16 other than the corner portion 16*a*. For example, the reinforcement 20 may be attached to the outside of the rear corner portion of the right side bar 16. This further increases the rigidity of the entire frame structure. In addition to the projection 21*a* of the reinforcement 21, another projection may be formed to correspond to the rear corner portion of the right side bar 16. The rear projection reinforces the rear corner portion of the right side bar 16.

The lower plate 1 may be formed by bending a single plate to make the thickness of the plate 1 the same as that of the reinforcement 21.

The locations of the reinforcement 21 and the reinforcement 20 may be exchanged.

In the illustrated embodiment, the opening 18*a* for removing the battery 23 is formed on one side of the frame structure. However, the opening 18*a* may be formed on both sides of the frame structure. In this case, both side bars 16, 17 are shaped to extend along the lower side of the corresponding opening. Each side bar 16, 17 is reinforced by the reinforcements 20, 21. This structure allows the battery 23 to be removed from either side of the vehicle.

The location of the front end portion 19 is not limited to the location of the illustrated embodiment as long as at least part of the front end portion 19 is higher than the front axle 22 or is located in the vicinity of the corresponding tilt cylinder holder 8 between the front cross plate 4 and the tilt cylinder holder 8. The front end portion 19 may overlap the corresponding holder 8. In this case, the load on the corresponding holder 8 is more effectively received by the side bar 16.

The frame structure of the present invention may be is used in industrial vehicles other than forklifts.

Therefore, the present examples and embodiment are to be considered as illustrative and not restrictive and the invention is not to be limited to the details given herein, but may be modified within the scope and equivalence of the appended claims.

What is claimed is:

1. An improved frame structure for an industrial vehicle, the frame structure including a lower plate, a front frame portion, a rear frame portion and a battery chamber, wherein the front frame portion is spaced apart from the rear frame portion and the battery chamber is located between the front frame portion and the rear frame portion, the battery chamber having an opening at a side of the frame structure for receiving a battery, the frame structure further comprising:

a coupler for coupling the front frame portion with the rear frame portion, wherein the coupler is shaped around the periphery of the opening, wherein the coupler includes a central portion extending along a bottom of the battery chamber and vertical portions, wherein each vertical portion extends along one of a pair of facing side walls of the battery chamber.

2. The frame structure according to claim 1, wherein the opening is defined by the bottom and side walls of the battery chamber.

3. The frame structure according to claim 1, wherein the coupler is reinforced by first and second reinforcements, wherein the first reinforcement reinforces the central portion of the coupler and the second reinforcement reinforces the central portion and one of the vertical portions.

4. The frame structure according to claim 3, wherein the second reinforcement is located at a corner of the opening.

5. The frame structure according to claim 3, wherein the coupler is located between the first reinforcement and the second reinforcement.

6. The frame structure according to claim 1, wherein the coupler includes a front end portion and a rear end portion, wherein the front end portion is attached to the front frame portion and the rear end portion is attached to the rear frame portion.

7. The frame structure according to claim 1, wherein the coupler is attached to the front frame portion at a location higher than the axis of a front axle.

8. The frame structure according to claim 1, wherein the front frame portion includes a front cross plate and a tilt cylinder holder, and wherein the coupler extends to a vicinity of the tilt cylinder holder.

9. The frame structure according to claim 1, further comprising at least one roller attached to the lower plate.

10. A frame structure for an industrial vehicle, the frame structure including a lower plate, a front frame portion, a rear frame portion and a battery chamber, wherein the front frame portion is spaced from the rear frame portion and the battery chamber is located between the front frame portion and the rear frame portion, the battery chamber having first and second openings at the sides of the frame structure, the first opening for receiving a battery, the frame structure further comprising:

a first coupler and a second coupler for coupling the front frame portion with the rear frame portion, wherein the first coupler is shaped around the periphery of the first opening and defines the first opening size through which the battery passes; and wherein the first coupler includes a central portion extending along a bottom of the battery chamber and vertical portions, wherein each vertical portion extends along one of the side walls of the battery chamber.

11. The frame structure according to claim 10, wherein the first and second openings are defined by the bottom and the side walls of the battery chamber.

12. The frame structure according to claim 11, wherein the first coupler is reinforced by first and second reinforcements, wherein the first reinforcement reinforces the central portion of the coupler and the second reinforcement reinforces the central portion and one of the vertical portions.

13. The frame structure according to claim 12, wherein the second reinforcement is located at a corner of the first opening.

14. The frame structure according to claim 12, wherein the first coupler is located between the first reinforcement and the second reinforcement.

15. The frame structure according to claim 10, wherein the first coupler includes a front end portion and a rear end portion, wherein the front end portion is attached to the front frame portion and the rear end portion is attached to the rear frame portion.

16. The frame structure according to claim 10, wherein the first coupler is attached to the front frame portion at a location higher than the axis of a front axle.

17. The frame structure according to claim 10, wherein the front frame portion includes a front cross plate and a tilt cylinder holder, and wherein the first coupler extends to a vicinity of the tilt cylinder holder.

18. The frame structure according to claim 10, further comprising at least one roller attached to the lower plate.

* * * * *